(12) United States Patent
Suzuki

(10) Patent No.: US 11,252,347 B2
(45) Date of Patent: Feb. 15, 2022

(54) IMAGE PICKUP APPARATUS, IMAGE PICKUP METHOD, AND STORAGE MEDIUM

(71) Applicant: CANON KABUSHIKI KAISHA, Tokyo (JP)

(72) Inventor: Takayuki Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/394,551

(22) Filed: Apr. 25, 2019

(65) Prior Publication Data

US 2019/0335120 A1  Oct. 31, 2019

(30) Foreign Application Priority Data

Apr. 26, 2018 (JP) .............................. JP2018-085317

(51) Int. Cl.
*H04N 5/341* (2011.01)
*H04N 5/232* (2006.01)

(52) U.S. Cl.
CPC ....... *H04N 5/3415* (2013.01); *H04N 5/23238* (2013.01)

(58) Field of Classification Search
CPC ............. H04N 5/3415; H04N 5/23238; H04N 5/23245; H04N 5/232
See application file for complete search history.

(56) References Cited

U.S. PATENT DOCUMENTS

| | | | |
|---|---|---|---|
| 2010/0245540 A1* | 9/2010 | Fukuzawa | G03B 17/28 348/36 |
| 2017/0221244 A1* | 8/2017 | Hiraga | G06T 11/60 |
| 2018/0220071 A1* | 8/2018 | Oshima | G06T 3/00 |

FOREIGN PATENT DOCUMENTS

| | | |
|---|---|---|
| JP | 2010-28764 A | 2/2010 |
| JP | 2012-105121 A | 5/2012 |

* cited by examiner

*Primary Examiner* — Tracy Y. Li
(74) *Attorney, Agent, or Firm* — Canon U.S.A., Inc. IP Division

(57) ABSTRACT

An image pickup apparatus includes: an image sensor; a first detection unit configured to detect movement of the image sensor; a second detection unit configured to compare images to detect a positional deviation thereof; a combining unit configured to combine the images on a basis of the detected positional deviation and to generate a panoramic image; and a display control unit, in which in a case where combining of images up to an Nth frame is completed by the combining unit, on a basis of information about a size of the panoramic image generated by combining the images up to the Nth frame and the movement of the image sensor, which is detected by the first detection unit and corresponds to frames from an (N+1)th frame to an (N+M)th frame, the display control unit generates information indicating progress of combining of the panoramic image.

12 Claims, 7 Drawing Sheets

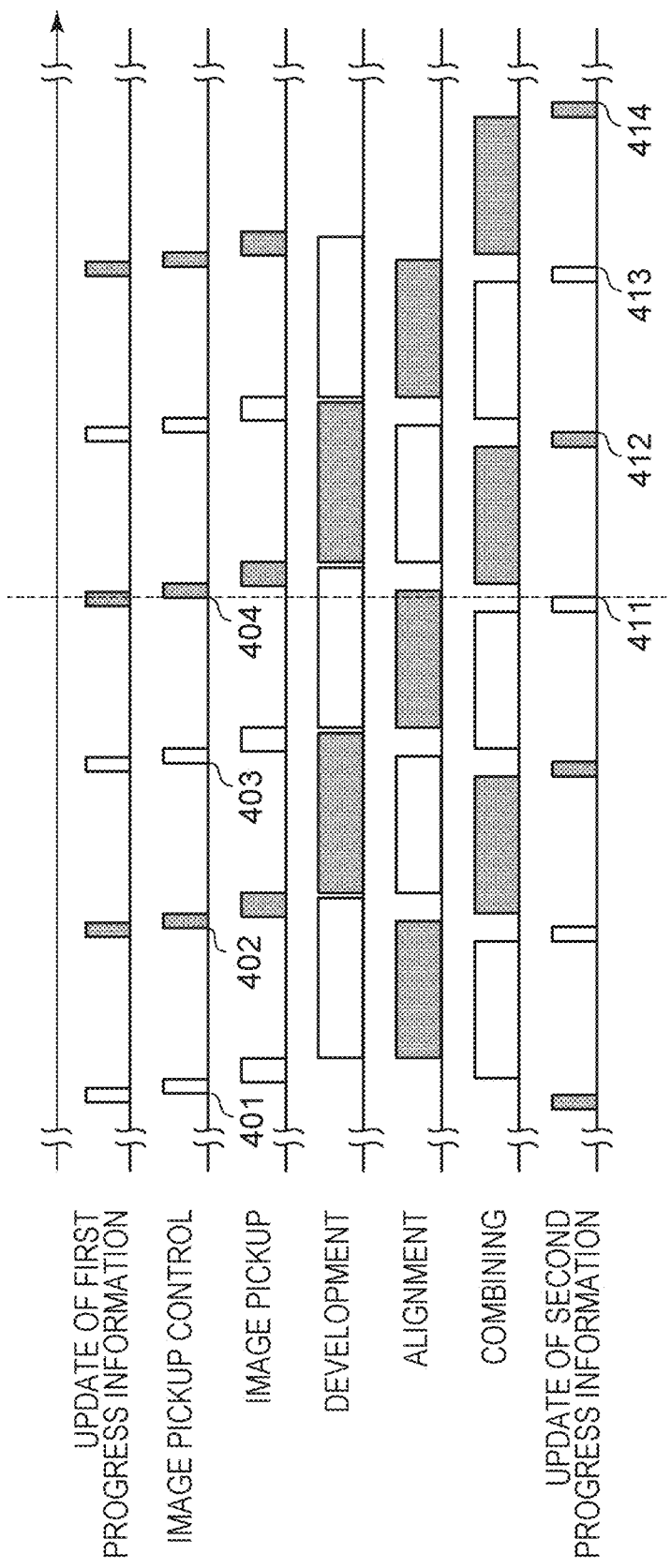

IMAGE PICKUP APPARATUS, IMAGE PICKUP METHOD, AND STORAGE MEDIUM

BACKGROUND

Field of the Disclosure

The present disclosure relates to an image pickup apparatus that combines a plurality of images to create a panoramic image, and particularly relates to generation and display of progress information when panoramic image pickup is performed.

Description of the Related Art

For example, Japanese Patent Laid-Open No. 2010-28764 discloses a method of picking up a plurality of images while panning an image pickup apparatus such as a digital camera, and combining the picked-up images to generate a panoramic image.

Japanese Patent Laid-Open No. 2012-105121 discloses a method of, in performing panoramic image pickup, calculating progress of the panoramic image pickup by using information, such as acceleration, which is detected from a gyro sensor or the like, and displaying the calculated information.

However, inertial information, such as angular speed, which is detected from the gyro sensor or the like provided in the image pickup apparatus such as a digital camera includes many errors due to various factors, and therefore, in the panoramic image pickup in which continuous image pickup is repeated, accuracy of progress information is lowered with progress of the image pickup.

Accordingly, there is a need for a method of displaying actual progress of panoramic combining.

Thus, a method of displaying actual progress of panoramic combining is proposed. FIG. 7 is a view for explaining timings of panoramic image pickup and combining processing.

A relationship of timings of image pickup control, image pickup, development, alignment, and combining from start of panoramic image pickup until end thereof is briefly illustrated in FIG. 7. FIG. 7 indicates four operations related to picked-up images in a series of the operations. An instruction to perform an image pickup operation is given at times 701, 702, and 703, and images to be combined are generated at times 711, 712, and 713. It is indicated that a long time lag is caused until each of the images to be combined is generated from start of each of the image pickup operations. When progress is presented to a user in such a manner as to display actual progress of panoramic combining as described above, a great time lag is caused between the operation of the image pickup control by the user and the presented progress, and therefore, it is difficult for the user to obtain information about the progress of the panoramic image pickup in real time.

Moreover, with the method of displaying actual progress of panoramic combining, detection of reaching an end of a maximum range of panning is delayed. The maximum range of panning indicates a maximum image width that allows combining in consideration of specification of an image pickup apparatus such as a digital camera, and even when panoramic image pickup is continued exceeding the maximum range of panning, a panoramic image having a width exceeding the maximum range is difficult to be created. However, when detection of reaching the end of the maximum range of panning is delayed, the user may continue an unnecessary panning operation without knowing that it is unable to create the panoramic image any more.

To describe this with reference to FIG. 7, it is assumed that the width of the panoramic image reaches the maximum range, for example, at the time 713. However, FIG. 7 indicates that an image used for combining processing completed at the time 713 has been already picked up at the time 721, and therefore, a long time lag is caused. Further, the user is not conscious that the series of operations ends until the time 713 and thus continues the image pickup operation even after the time 703 has passed, resulting that an image picked up after the time 703 is not usable for combining.

SUMMARY

The disclosure is made in view of the aforementioned problems and provides an image pickup apparatus that is capable of accurately presenting a progress status of panoramic image pickup to a user.

In order to solve the aforementioned problems, the disclosure of the present application provides an image pickup apparatus including an image sensor, a first detection unit, a second detection unit, a combining unit, and a display control unit. The image sensor is configured to pick up a plurality of images. The first detection unit is configured to detect movement of the image sensor in performing image pickup by using inertial information. The second detection unit is configured to detect a positional deviation of the plurality of images by comparing at least some of the plurality of images. The combining unit is configured to combine the plurality of images on a basis of the detected positional deviation and to generate a panoramic image. The display control unit is configured to cause a display unit to display information indicating progress of combining of the panoramic image. In a case where an image of an (N+M)th frame is picked up by the image sensor and combining of images up to an Nth frame is completed by the combining unit, on a basis of information about a size of the panoramic image generated by combining the images up to the Nth frame and the movement of the image sensor, which is detected by the first detection unit and corresponds to frames from an (N+1)th frame to the (N+M)th frame, the display control unit generates information indicating progress of combining of the panoramic image.

Further features of the present disclosure will become apparent from the following description of exemplary embodiments with reference to the attached drawings.

BRIEF DESCRIPTION OF THE DRAWINGS

FIG. 4 is a view for explaining timings of operations of panoramic combining according to one or more aspects of the present disclosure.

DESCRIPTION OF THE EMBODIMENTS

Suitable embodiments of the disclosure will be described in detail below with reference to the accompanying drawings.

First Embodiment

Figure 1:
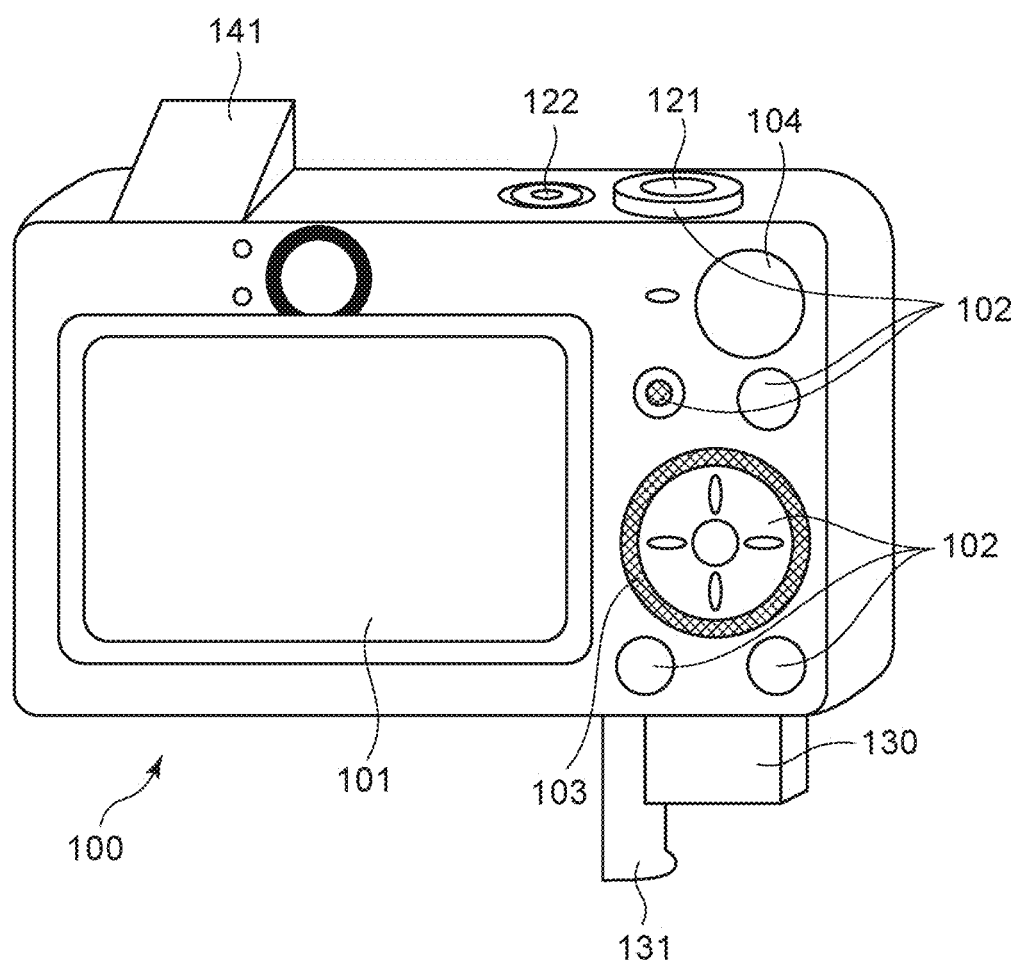
FIG. 1 is a back perspective view illustrating a schematic configuration of a digital camera according to one or more aspects of the present disclosure.

FIG. 1 is a back perspective view illustrating a schematic configuration of a digital camera according to an embodiment of the disclosure.

On a back surface of a digital camera 100, a display unit 101 that displays an image and various information and an operation unit 102 that is constituted by operation members, such as various switches and buttons, for receiving various operations by a user are provided. Further, a mode change switch 104 that is used to change an image pickup mode or the like and a controller wheel 103 that is rotationally operatable are also provided on the back surface of the digital camera 100. On a top surface of the digital camera 100, a shutter button 121 through which an image pickup instruction is given, a power switch 122 that switches on/off of a power of the digital camera 100, and a flash 141 that emits flash to an object are provided.

The digital camera 100 is able to be connected to an external apparatus through wired or wireless communication and to output image data (still image data or moving image data) or the like to the external apparatus. On a lower surface of the digital camera 100, a recording medium slot (not illustrated) that is openable and closable by a lid 131 is provided so as to enable insertion and removal of a recording medium 130, such as a memory card, to and from the recording medium slot.

The recording medium 130 stored in the recording medium slot is able to communicate with a system control unit 210 (refer to FIG. 2) of the digital camera 100. Note that, the recording medium 130 is not limited to a memory card or the like that is able to be inserted to and removed from the recording medium slot, and may be an optical disk or a magnetic disk such as a hard disk or may be built in a main body of the digital camera 100.

Figure 2:
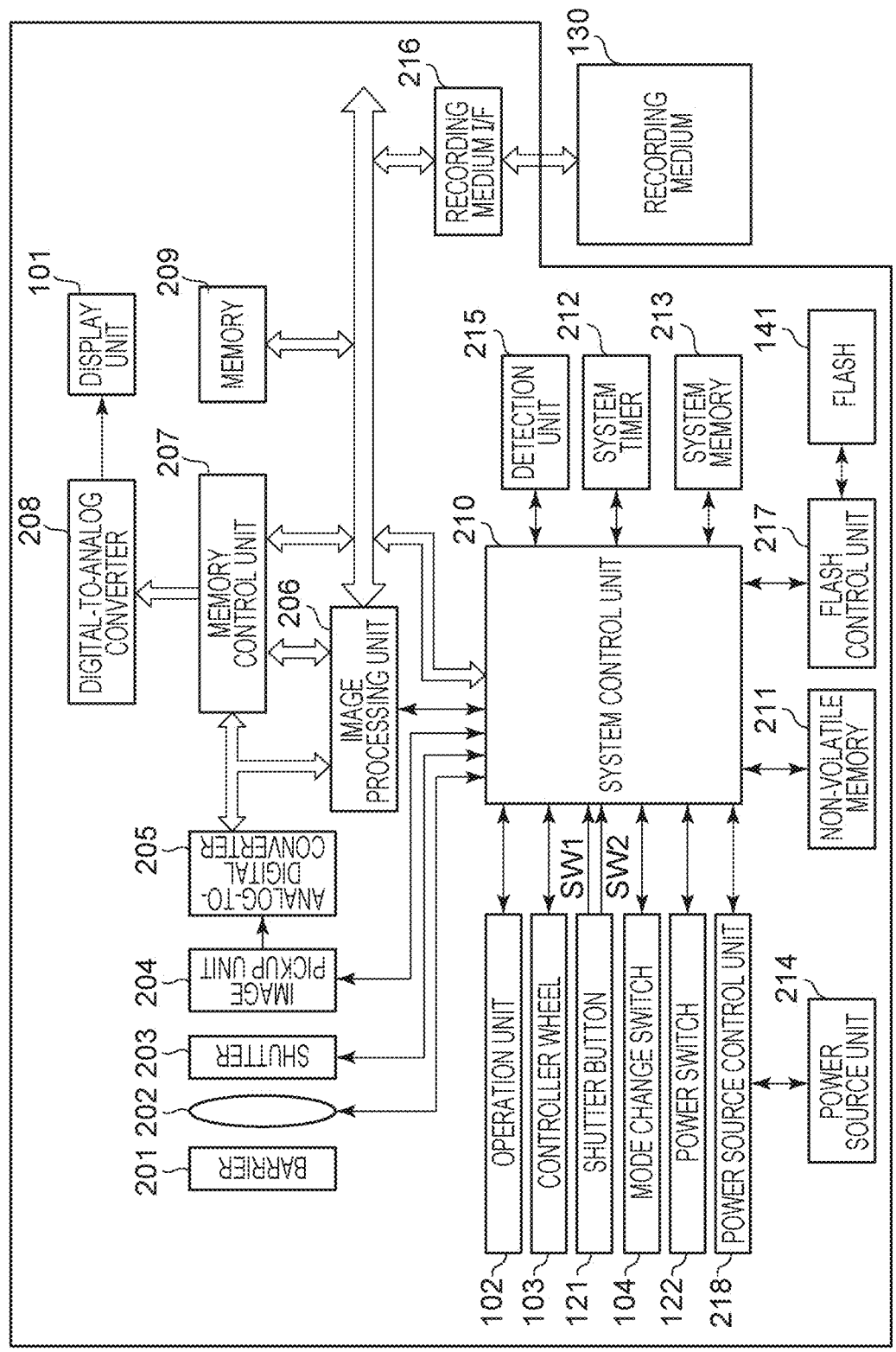
FIG. 2 is a block diagram illustrating a hardware configuration of the digital camera according to one or more aspects of the present disclosure.

FIG. 2 is a block diagram illustrating a hardware configuration of the digital camera 100. The digital camera 100 includes a barrier 201, an image pickup lens 202, a shutter 203, and an image pickup unit 204. The barrier 201 prevents dirt and damage of an image pickup optical system by covering the image pickup optical system. The image pickup lens 202 is constituted by a lens group including a zoom lens and a focus lens, and forms the image pickup optical system. The shutter 203 includes an aperture function and adjusts an amount of light to which the image pickup unit 204 is exposed. The image pickup unit 204 is an image pickup element that converts an optical image into an electrical signal (analog signal) and is an image sensor, for example, such as a CCD sensor or a CMOS sensor having a Bayer array structure in which RGB pixels are regularly arranged. Note that, the shutter 203 may be a mechanical shutter or may be an electronic shutter that controls an accumulation period by controlling a reset timing of the image pickup element.

Alternatively, when the image pickup unit 204 has a structure in which a plurality of photoelectric conversion units are provided in one pixel so that a stereo image is able to be acquired, automatic focus detection (AF) processing described below is able to be performed more promptly.

The digital camera 100 includes an analog-to-digital converter 205, an image processing unit 206, a memory control unit 207, a digital-to-analog converter 208, a memory 209, and the system control unit 210. An analog signal is output from the image pickup unit 204 to the analog-to-digital converter 205, and the analog-to-digital converter 205 converts the acquired analog signal into image data formed of a digital signal and outputs the image data to the image processing unit 206 or the memory control unit 207.

The image processing unit 206 performs correction processing, such as pixel interpolation or shading correction, white balance processing, gamma correction processing, color conversion processing, or the like for the image data acquired from the analog-to-digital converter 205 or data acquired from the memory control unit 207. Moreover, the image processing unit 206 implements an electronic zoom function by performing image cut-out processing or variable magnification processing. Furthermore, the image processing unit 206 performs predetermined calculation processing by using the image data of the picked-up image, and the system control unit 210 performs exposure control or distance measuring control on the basis of a calculation result thus obtained. For example, the system control unit 210 performs AF (automatic focusing) processing of a TTL (through the lens) system, AE (automatic exposure) processing, or EF (pre-emission of flash) processing. The image processing unit 206 performs predetermined calculation processing by using the image data of the picked-up image, and the system control unit 210 performs AWB (automatic white balance) processing of the TTL system by using an obtained calculation result.

The image processing unit 206 has an image combining processing circuit that combines a plurality of images to create a panoramic image and determines a result of the combining. The image combining processing circuit is able to perform processing of not only simple addition average combining but also processing such as comparison lighten composition or comparison darken composition in which one piece of image data is generated by selecting a pixel having a brightest value or a darkest value in an area of each image data pieces to be combined. Moreover, the image combining processing circuit evaluates and determines a result of combining on the basis of a specific reference. For example, in a case where the number of images that are combined does not meet a predetermined number or a length of a combined image does not meet a reference value, the image combining processing circuit determines that the combining is failed. Note that, instead of a configuration in which the image processing unit 206 is provided, a configuration in which a function of the image combining processing is implemented by software processing by the system control unit 210 may be provided.

The image data output from the analog-to-digital converter 205 is written into the memory 209 via the image processing unit 206 and the memory control unit 207 or via the memory control unit 207. The memory 209 serves as an image display memory (video memory) in which image data displayed on the display unit 101 is stored. The memory 209 has a memory capacity which enables storing the predetermined number of still images and panoramic images (wide angle images), and a panoramic image combining result.

Note that, the memory 209 is able to be used also as a working area to which a program or the like that the system control unit 210 reads from a non-volatile memory 211 is developed.

Image display data (digital data) stored in the memory 209 is transmitted to the digital-to-analog converter 208. The digital-to-analog converter 208 converts the received digital data into an analog signal and supplies the analog signal to the display unit 101, and an image is thereby displayed on the display unit 101. The display unit 101 is a display device, such as a liquid crystal display or an organic EL display, and displays an image on the basis of the analog signal from the digital-to-analog converter 208. The system control unit 210 switches on/off of display of an image on the display unit 101, and power consumption is able to be reduced by turning off the display of an image. Note that, an electronic view finder function of displaying a through image is able to be achieved by converting a digital signal that is accumulated in the memory 209 through the analog-to-digital converter 205 from the image pickup unit 204 into an analog signal by the digital-to-analog converter 208 and consecutively performing display on the display unit 101.

The digital camera 100 includes the non-volatile memory 211, a system timer 212, a system memory 213, a detection unit 215, and a flash control unit 217. The non-volatile memory 211 is a memory (for example, EEPROM or the like) that allows electrical elimination and storage, and stores a program executed by the system control unit 210, a constant for an operation, or the like. Moreover, the non-volatile memory 211 has an area in which system information is stored and an area in which user setting information is stored, and the system control unit 210 reads and restores various kinds of information and setting that are stored in the non-volatile memory 211 at a time of start-up of the digital camera 100.

The system control unit 210 includes a CPU and controls an entire operation of the digital camera 100 by executing various program codes stored in the non-volatile memory 211. Note that, a program, a constant for an operation, a variable, or the like that the system control unit 210 reads from the non-volatile memory 211 is developed onto the system memory 213. A RAM is used for the system memory 213. Furthermore, the system control unit 210 controls display by controlling the memory 209, the digital-to-analog converter 208, the display unit 101, and the like. The system timer 212 measures time used for various kinds of control and time of a built-in clock. The flash control unit 217 controls light emission of the flash 141 in accordance with brightness of an object. The detection unit 215 includes a gyro sensor and an acceleration sensor, and acquires angular speed information, acceleration information, posture information, or the like about the digital camera 100. Note that, the angular speed information includes information about an angular speed and angular acceleration at a time of panoramic image pickup by the digital camera 100. Moreover, the posture information includes information, for example, about inclination of the digital camera 100 relative to a horizontal direction.

The display unit 101, the operation unit 102, the controller wheel 103, the shutter button 121, the mode change switch 104, the power switch 122, and the flash 141 that are illustrated in FIG. 2 are the same as those described with reference to FIG. 1.

Various operation members that constitute the operation unit 102 are used for selecting various function icons displayed on the display unit 101, for example. When a certain function icon is selected, functions are allocated in each case. That is, the operation members of the operation unit 102 act as various function buttons. Examples of the function buttons include an end button, a back button, an image forward button, a jump button, a narrowing-down button, an attribute changing button, and a DISP button. For example, when a menu button is pressed, a menu screen for performing various kinds of setting is displayed on the display unit 101. A user is able to perform a setting operation intuitively by using the menu screen displayed on the display unit 101, an up, down, left, and right four-direction button, and a SET button.

The controller wheel 103 serving as an operation member that is rotationally operatable is used with the four-direction button, for example, when a selection item is designated. The rotational operation of the controller wheel 103 generates an electric pulse signal corresponding to an operation amount (angle of rotation, the number of times of rotation, or the like). The system control unit 210 analyzes the pulse signal, and controls each unit of the digital camera 100.

The shutter button 121 has a first switch SW1 and a second switch SW2. The first switch SW1 is switched on when the shutter button 121 is in a half-pressed state halfway through an operation of the shutter button 121, and thereby, a signal that instructs an image pickup preparation is transmitted to the system control unit 210. When receiving the signal indicating that the first switch SW1 is switched on, the system control unit 210 starts an operation of AF processing, AE processing, AWB processing, EF processing, or the like. The second switch SW2 is switched on when the shutter button 121 is in a full-pressed state where the operation of the shutter button 121 is completed, and thereby, a signal that instructs start of image pickup is transmitted to the system control unit 210. When receiving the signal indicting that the second switch SW2 is switched on, the system control unit 210 performs a series of image pickup operations from reading of the signal from the image pickup unit 204 to writing of the image data to the recording medium 130.

The mode change switch 104 is a switch that changes an operation mode of the digital camera 100 among various modes, such as a still image pickup mode, a moving image pickup mode, and a reproducing mode. The still image pickup mode includes a panoramic image pickup mode in which a combined panoramic image is obtained by panoramic image pickup in addition to an automatic image pickup mode or the like.

The digital camera 100 includes a power source unit 214 and a power source control unit 218. The power source unit 214 is a primary battery, such as an alkaline battery or a lithium battery, a secondary battery, such as a NiCd battery, a NiMH battery, or a Li battery, an AC adaptor, or the like, and supplies power to the power source control unit 218. The power source control unit 218 detects whether or not a battery is attached to the power source unit 214, a type of the battery, a remaining battery capacity, or the like, and supplies a required voltage to the units including the recording medium 130 during a required period on the basis of a result of the detection and an instruction of the system control unit 210.

The digital camera 100 includes a recording medium I/F 216 that allows communication between the recording medium 130 and the system control unit 210 when the recording medium 130 is mounted in the recording medium slot (not illustrated). Since details of the recording medium 130 have been already described with reference to FIG. 1, the description is omitted here.

Figure 3A:
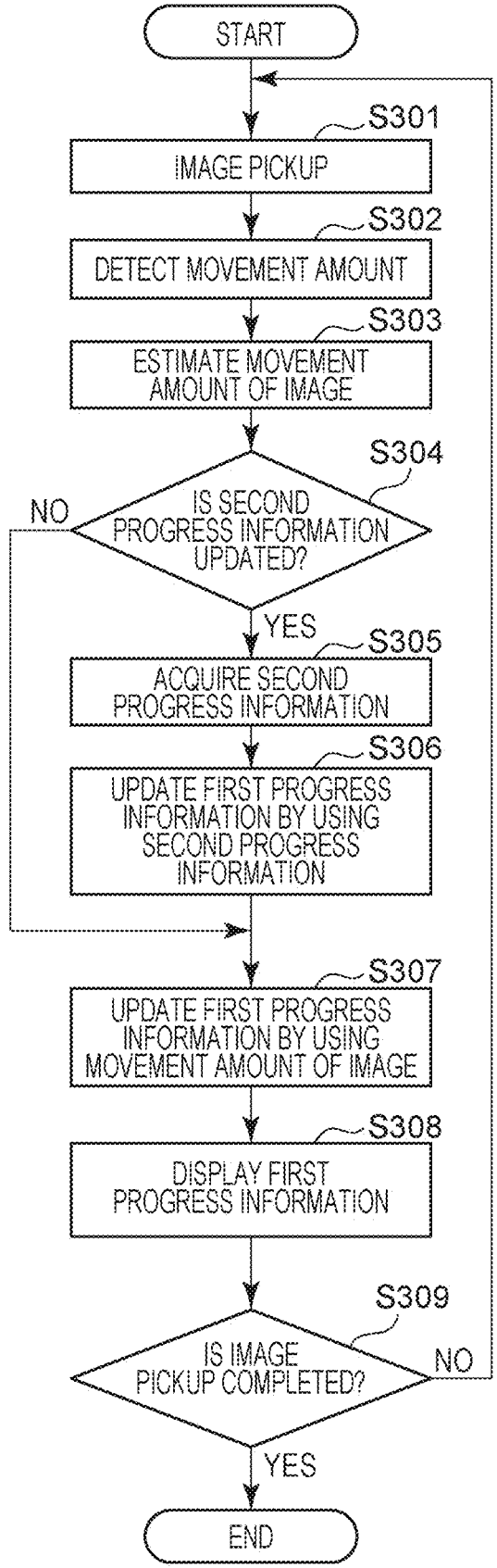
FIGS. 3A and 3B are flowcharts for explaining panoramic image pickup according to one or more aspects of the present disclosure.
Figure 3B:
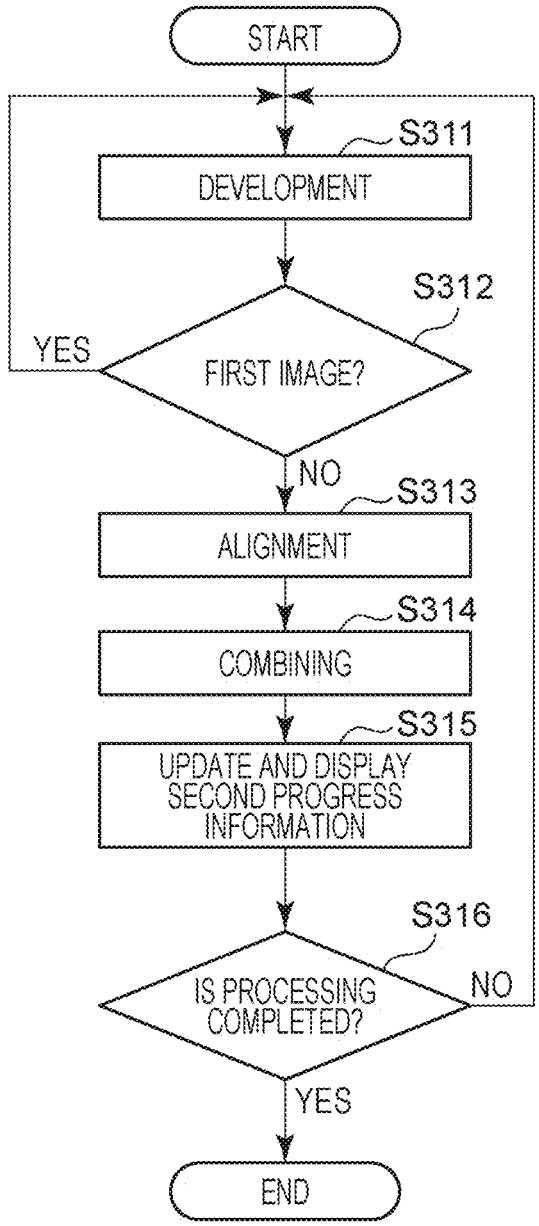

FIGS. 3A and 3B are flowcharts for explaining panoramic image pickup in the present embodiment. The present embodiment will be described below with reference to the flowcharts illustrated in FIGS. 3A and 3B. Among them, FIG. 3A is the flowchart mainly related to image pickup and update of first progress information and FIG. 3B is the flowchart mainly related to combining and update of second progress information.

At step S301, the image pickup unit 204 performs image pickup under image pickup conditions such as a focal length, exposure, image pickup sensitivity, and WB which are set in advance.

At step S302, the detection unit 215 detects a movement amount of the digital camera 100. The movement amount detected here is used to update the first progress information at step S307 described below. Details thereof will be described below.

At step S303, the system control unit 210 estimates a movement amount of an image by using the movement amount detected by the detection unit 215 at step S302. Specifically, on the basis of the movement amount detected by the detection unit 215, the system control unit 210 also uses information about the focal length or the like to estimate a pixel number by which a view angle of the image is changed during the movement of the digital camera 100.

At step S304, the system control unit 210 determines whether the second progress information is updated. Specifically, the system control unit 210 determines whether the second progress information is updated after previous update of the first progress information at step S307 described below. When the second progress information is updated, the procedure proceeds to step S305, and the system control unit 210 acquires the second progress information. Next, the procedure proceeds to step S306 and the system control unit 210 updates the first progress information by using the second progress information. A method of updating the first progress information by using the second progress information will be described later. On the other hand, when the system control unit 210 determines at step S304 that the second progress information is not updated, the procedure directly proceeds to step S307 to update the first progress information.

Here, the first progress information indicates progress that reflects information obtained through detection by the detection unit 215 and indicates one that reflects information or the like obtained from a positional change of the digital camera 100 that is obtained by the acceleration sensor, for example. The first progress information is different from the second progress information obtained through comparison of images to be combined described below in terms of reflecting the detection of the detection unit 215. Here, since the detection result of the detection unit 215 is reflected in the first progress information, the first progress information is able to more immediately reflect progress of combining. The display unit 101 displays the first progress information at step S308.

At step S309, the system control unit 210 determines as to whether image pickup is completed by reaching a maximum range. Here, a reference of the determination as to completion of image pickup is any of whether a preset number of images to be picked up is reached, whether a width of a combined image is reached, whether a set position is reached, whether an upper limit of the capacity of the recording medium 130 or a set capacity is reached, and the like. The system control unit 210 may determine whether the width of the combined image is reached on the basis of the first progress information as described below. When the system control unit 210 determines that image pickup is completed, the flow ends, and when the system control unit 210 determines that image pickup is not completed, the procedure proceeds to step S309.

The above is the description for FIG. 3A.

Next, description will be given for FIG. 3B. At step S311, the image processing unit 206 performs development processing for the image picked up by the image pickup unit 204 at step S301. In the development processing, the image processing unit 206 performs correction processing, such as pixel interpolation or shading correction, white balance processing, gamma correction processing, color conversion processing, or the like and converts the picked-up image to have a format suitable for panoramic combining. Note that, a relationship of timings between the image pickup performed by the image pickup unit 204 at step S301 and the development performed by the image processing unit 206 at step S311 will be described below.

At step S312, the system control unit 210 determines whether the image developed at step S311 is a first image. When there is only one image, combining processing or the like is not able to be performed, so that the procedure returns to step S311, and when a second image is picked up by the image pickup unit 204 at step S301, development processing is performed for the second image. On the other hand, when the image is not a first image, the procedure proceeds to step S313.

By comparing some images developed at step S311, the system control unit 210 detects a positional deviation between the images and performs alignment at step S313. Specifically, the system control unit 210 performs alignment of the image developed by the image processing unit 206 and an image that is most recently developed or combined. An example of a method of the alignment includes a template matching method. First, the image processing unit 206 cuts out a region with less distortion near a center part of the image developed by the image processing unit 206 at step S311. The image processing unit 206 divides the cut-out region into small blocks of any size. It is desirable that the image processing unit 206 sets each of the blocks to have the same size. Next, for the other image, the image processing unit 206 sets search ranges so as to be at the same positions as those of the set blocks and wider than those of the blocks. Lastly, the image processing unit 206 calculates, in each of the search ranges of the other image, a corresponding point at which a sum of absolute difference (hereinafter, referred to as SAD) of luminance with respect to the block that is set first is the smallest. The system control unit 210 calculates a positional deviation, as vector, from a center of the block that is set first and the aforementioned corresponding point. In the calculation of the corresponding point described above, the system control unit 210 may use sum of squared difference (hereinafter, referred to as SSD), normalized cross correlation (hereinafter, referred to as NCC), or the like, in addition to the SAD. Next, the system control unit 210 calculates a transformation coefficient from an amount of the positional deviation. The system control unit 210 uses, for example, a projective transformation coefficient as the transformation coefficient. However, the transformation coefficient is not limited only to the projective transformation coefficient and an affine transformation coefficient or a simplified transformation coefficient including only a horizontal/vertical shift may be used. For example, the system control unit 210 is able to perform transformation by using an equation indicated by equation (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

In equation (1), (x', y') indicates coordinates after the transformation is performed and (x, y) indicates coordinates before the transformation is performed. A matrix A indicates the transformation coefficient described above. Lastly, by applying the calculated transformation coefficient to each of pixels of the image developed at step S311, the image processing unit 206 is able to align the image.

At step S314, the image processing unit 206 combines the images. Using a center of a region where the images to be combined are overlapped as a border, the image processing unit 206 outputs pixel information, corresponding to one cut-out region on a left side of the border and another cut-out region on a right side of the border, to a combined image. By repeating the combining processing of step S314, the image processing unit 206 is able to sequentially create a panoramic image.

At step S315, the system control unit 210 updates the second progress information by using the width of the combined image obtained through the combing processing performed by the image processing unit 206 at step S309. While the first progress information described above is calculated also by using information from the detection unit 215, the second progress information is calculated, for example, from a pixel of an image actually obtained through combining, without using information from the detection unit 215. As described above, inertial information, such as acceleration, which is detected by the detection unit 215 includes many errors in many cases and has low credibility, whereas the second progress information calculated from the actually combined image has relatively high credibility. The system control unit 210 displays the second progress information on the display unit 101 in addition to the update of the second progress information.

At step S316, the system control unit 210 determines whether the processing is completed. A reference of the determination as to completion of the processing here may be similar to that of step S309.

FIG. 4 is a view for explaining timings of operations of panoramic combining in the present embodiment. The flow of the present embodiment described above will be described again with reference to FIG. 4.

The timing view illustrated in FIG. 4 indicates timings of update of the first progress information, image pickup control, image pickup, development, alignment, combining, and update of second progress information in the present embodiment. The figure illustrated in FIG. 4 indicates four operations related to picked-up images in a series of operations. It is indicated that image pickup control of an Nth frame is performed at a time 401, and subsequently, image pickup, development, alignment, and combining are performed, and lastly, update of the second progress information of the Nth frame is performed at a time 411. When the progress is presented to a user on the basis of the progress indicating that combining is actually completed, that is, on the basis of the second progress information, an image that is actually able to be combined even at a time 404 is the image that is picked up first as illustrated in FIG. 4, and thus the display unit 101 is able to display only the progress of the image that is able to be combined first. As indicated in FIG. 4, however, at the time 404, image pickup control of an (N+3)th image has been already started, that is, the user has performed a panning operation up to a position of the (N+3)th image. However, the display unit 101 is able to display only the progress corresponding to the Nth image.

Thus, in the present embodiment, in addition to the progress (second progress information) of the image that is actually able to be combined, the progress of combining is displayed by also using information detected by the detection unit 215. In a status indicated in FIG. 4, the display unit 101 displays progress information by using the movement amount of the digital camera 100, which is detected by the detection unit 215, at each of times 401, 402, and 403. At the time 404, update of the first progress information is started by using the movement amount detected by the detection unit 215. At this time, when the second progress information is updated, the update of the first progress information is performed ahead by using a result of the update of the second progress information.

Table 1 is a table for more specifically explaining the calculation of the progress information described above.

TABLE 1

|  | Time of completion of image pickup | Movement amount of image by detection unit 215 | Coordinate of end of combined image |
| --- | --- | --- | --- |
| First frame | Time t1 | p1 | x1 |
| Second frame | Time t2 | p2 | x2 |
| Third frame | Time t3 | p3 | x3 |
| Fourth frame | Time t4 | p4 | x4 |
| Fifth frame | Time t5 | p5 | x5 |

In Table 1, five frames whose images are completed to be picked up at times t1 through t5 are described. It is assumed that image movement amounts estimated from inertial information detected by the detection unit 215 at the timings corresponding to the times t1 through t5 are respectively p1 through p5. It is also assumed that x-coordinates of ends of combined images that are able to be obtained by combining the first to fifth frames are respectively x1 through x5. Note that, here, for simplification, when cylindrical transformation or the like is necessary, a coordinate on a two-dimensional plane after such transformation is performed is considered. Further, it is assumed here that a variation in a y-direction is completely canceled out at a time of alignment, so that only a variation in an x-direction is considered. Accordingly, only the coordinate in the x-direction is described in "coordinate of end of combined image" in Table 1.

Here, to describe in comparison with FIG. 4, it is assumed that the fourth frame described in Table 1 is a frame obtained by image pick up, image pickup control of which is started at the time 404 in FIG. 4. It is found from the timings of FIG. 4 that combining has been already finished by using the image obtained through image pickup, image pickup control of which is started at the time 401, at the time when image pickup of the fourth frame is completed. That is, a combined image using the first frame has been already completed and the coordinate x1 of the end of the combined image is obtained at the time t4 in Table 1. On the other hand, since combined images using the second frame through the fourth frame are not completed at the time t4, the coordinates x2 through x4 of ends of the combined images are not obtained yet. At the time t4, however, the image movement amounts p1 through p4 by the detection unit 215 are obtained. Here, by using the image movement amounts p2 through p4 by the detection unit 215 that correspond to the coordinates x2 through x4 of the ends of the combined images that are not obtained, the first progress information is updated. That is, at the time t4, the second progress information corresponds to the coordinate of the end of the combined image and is x4. On the other hand, at the time t4, the first progress information is x1+p2+p3+p4.

Here, it is to be noted that the first progress information is not p1+p2+p3+p4. As described above, an image movement amount by the detection unit 215 includes many errors, and, in a part in which a coordinate of an end of a combined image is obtained, the first progress information is estimated from the combined image.

The calculation as described above is able to be generalized. That is, it is assumed that, at a time when image pickup of an (N+M)th frame is completed, the image movement amounts up to an image movement amount p(N+M) by the detection unit 215 are obtained and a combined image using up to the Nth frame is completed. Then, since a coordinate of an end of the combined image is xN, the second progress information is xN. A combined image using an (N+1)th frame through the (N+M)th frame after the Nth frame is not completed, but image movement amounts p(N+1) through p(N+M) by the detection unit 215 are obtained. Thus, the first progress information at that time is xN+p(N+1)+p(N+2)+ . . . +p(N+M).

Figure 5A:
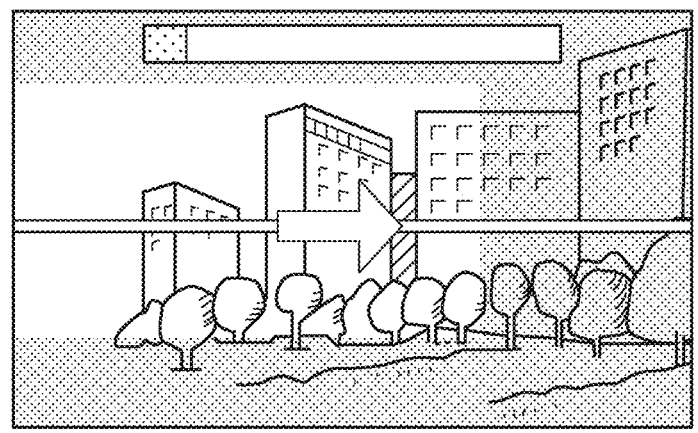
FIGS. 5A through 5C are views for explaining display of a display unit 101 in panoramic combining according to one or more aspects of the present disclosure.
Figure 5B:
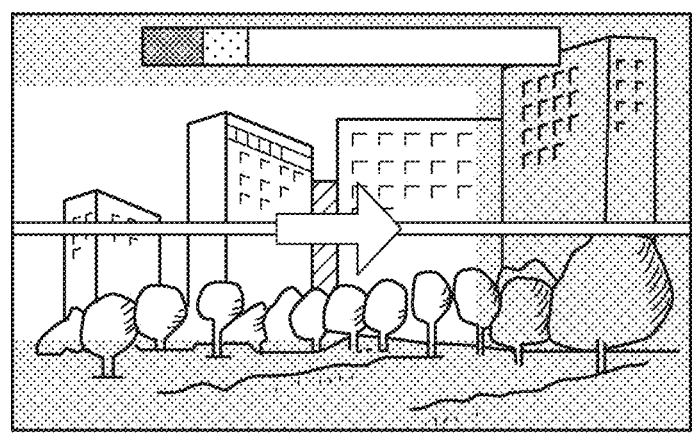
Figure 5C:
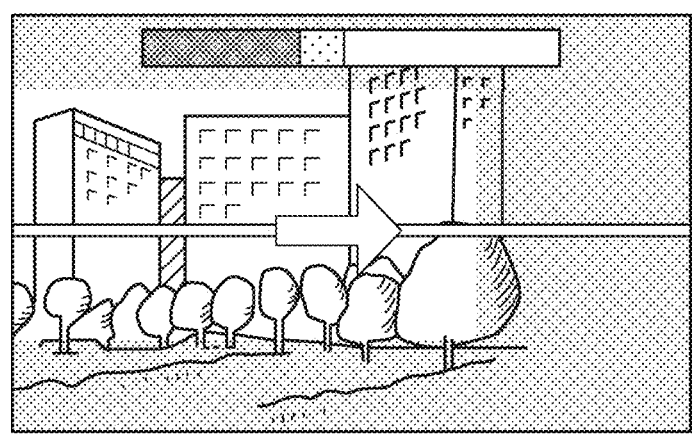

FIGS. 5A through 5C are views for explaining display of the display unit 101 in panoramic combining in the present embodiment. FIGS. 5A through 5C are provided in chronological order and each indicate that a panning operation is performed from left to right in a screen. A progress bar of a bar shape appears in an upper part of the screen of each of FIGS. 5A through 5C. The progress bar presents progress of image pickup to a user. When panoramic image pickup is not started at all, the progress bar indicates blank. When panoramic image pickup is started, the progress bar indicates two kinds of colors of a dark color and a light color in some cases. In FIGS. 5A through 5C, the first progress information described above is indicated with the light color and the dark color in combination and the second progress information described above is indicated with the dark color. That is, when pickup of (N+M) images is finished and panoramic combining up to an Nth image is completed, the second progress information corresponding to the Nth image corresponds to the progress bar with the dark color. An accumulation result of image movement amounts by the detection unit 215 from an (N+1)th image to an (N+M)th image corresponds to the progress bar with the light color. At least the progress bar with the dark color indicates accurate progress information that does not include an error, and the progress bar with the light color includes an error resulting from the detection unit 215 but is able to suppress a delay for an actual image pickup operation. Note that, though description has been given here by taking an example in which different color densities are used, display may be performed in different forms by differentiating a thickness, a degree of transparency, a color, brightness, a pattern, or the like of the progress bar.

The image pickup operation illustrated in FIGS. 5A through 5C will be specifically described. FIG. 5A illustrates a status where the panning operation has been already started, but combining of images has not been completed yet. At any time in a time zone from the times 401 to 403 in FIG. 4, the display unit 101 displays the screen as illustrated in FIG. 5A.

FIG. 5B illustrates a status where combining of the images is started to be completed. FIG. 5C illustrates a status where the panning operation is further progressed and combining of the images is also further completed. FIGS. 5B and 5C indicate that a part that originally has the light color in FIG. 5A is changed to have the dark color. After the time 411 in FIG. 4, the display unit 101 displays the screen as illustrated in FIG. 5B or 5C.

Note that, even when the user moves in a direction opposite to that of the first panning operation due to an erroneous operation or the like, a width of an image obtained by combining does not change, so that the dark color meaning the second progress information is not reduced. In this case, a specification that does not allow such reduction may be set in advance also to the first progress information.

As described above, the user performing panoramic image pickup is able to acquire the movement amount of the digital camera by both the first progress information based on the output of the gyro sensor or an angular speed sensor and the second progress information based on a panoramic combined image, and thus the user is able to easily perform the panoramic image pickup with a desired view angle.

Further, though the first progress information is acquired immediately before image pickup in the present embodiment, the first progress information may be updated at all times to acquire the first progress information in accordance with a timing of update of information of the display unit 101. In such a case, movement of the digital camera 100 is able to be more immediately displayed.

According to the first embodiment, progress of panoramic image pickup is able to be displayed by taking a balance between a real time property and accuracy by using both a detection result of position information by the detection unit 215 and progress of actual combining of images.

Second Embodiment

In the first embodiment, the display unit 101 displays the first progress information and the second progress information by using different colors of the light color and the dark color. However, some users of an image pickup apparatus are not very interested in a degree at which combining is actually completed. Display of the second progress information is rather troublesome for the users and gives an impression that the screen of the display unit 101 is cluttered.

Figure 6A:
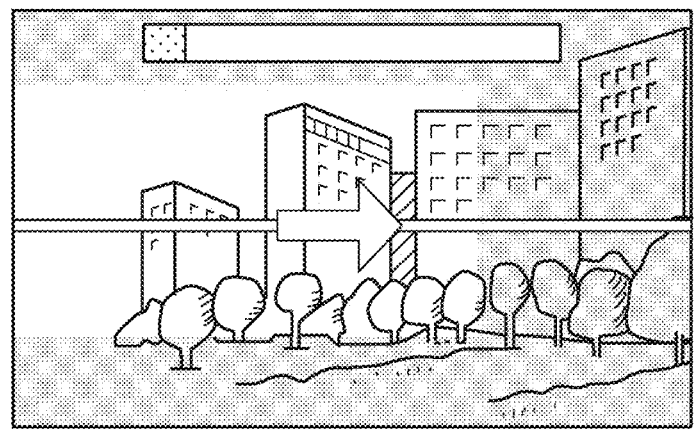
FIGS. 6A through 6C are views for explaining display of the display unit 101 in panoramic combining according to one or more aspects of the present disclosure.
Figure 6B:
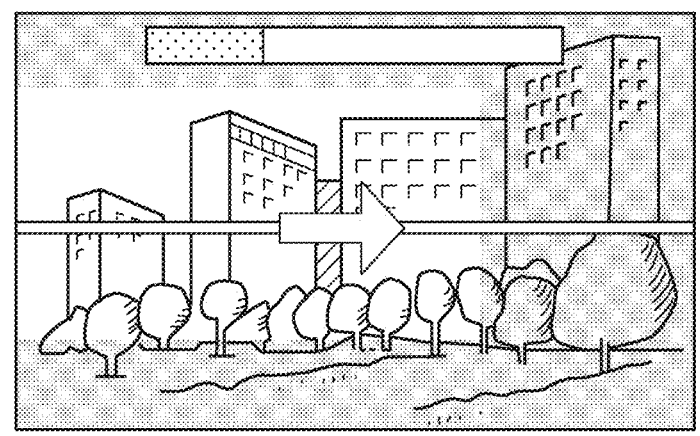
Figure 6C:
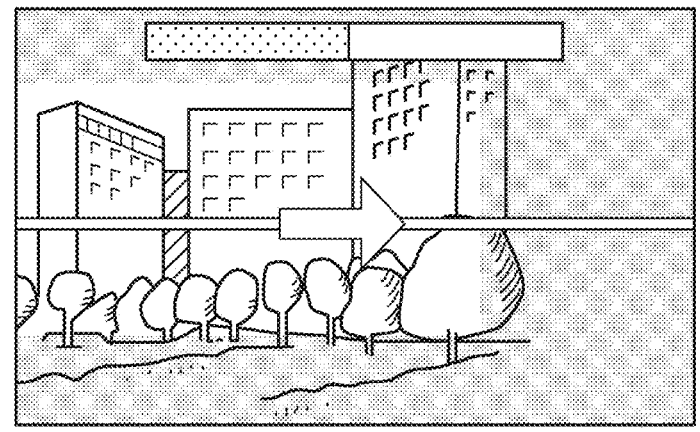
Figure 7:
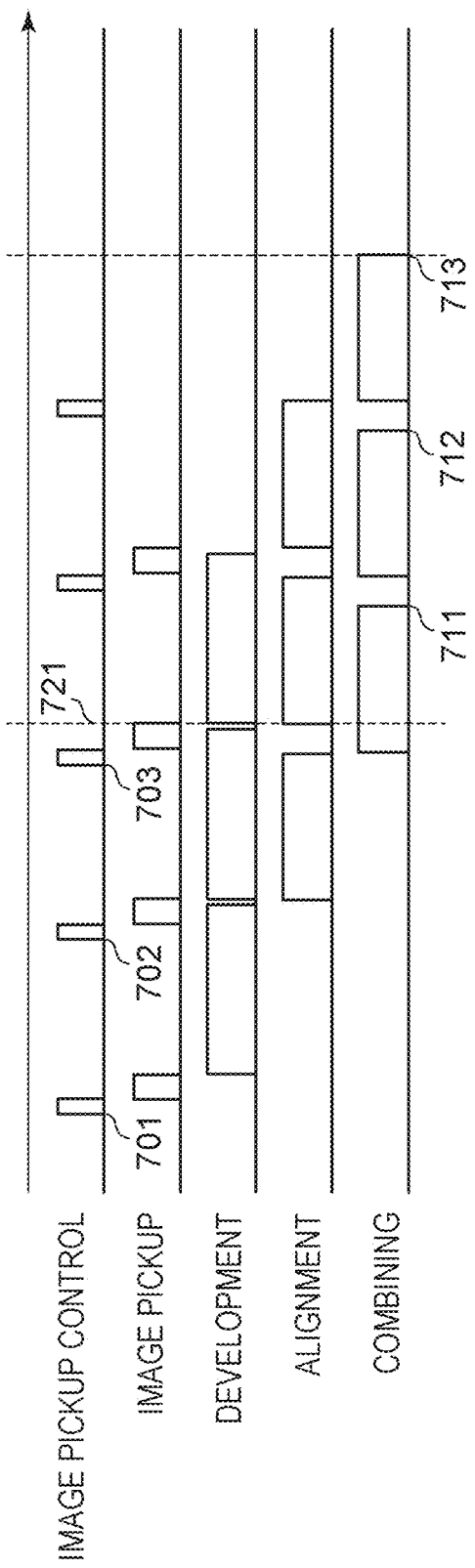
FIG. 7 is a view for explaining timings of panoramic image pickup and combining processing.

Thus, in a second embodiment, the first progress information is displayed without displaying the second progress information. FIGS. 6A to 6C are views for explaining display of the display unit 101 in panoramic combining in the second embodiment. FIGS. 6A to 6C illustrate timings similar to those of FIGS. 5A to 5C. FIGS. 6A to 6C are characterized in that there is only the light color meaning the first progress information in the progress bar.

According to the second embodiment, in comparison with the first embodiment, it is possible to display progress of panoramic image pickup in a plainer and simpler screen when progress of actual combining is not necessary for a user.

Other Embodiments

In the foregoing embodiments, the description has been given on the basis of a digital camera for private use. However, the embodiments are also applicable to a portable device, a smartphone, a network camera connected to a server, or the like when being provided with a panoramic image pickup and combining function.

Note that, the disclosure may be implemented by processing of supplying a program for realizing one or more functions of the foregoing embodiments to a system or an apparatus via a network or a recording medium, and reading and executing the program by one or more processors of a computer of the system or the apparatus. The disclosure may be implemented by a circuit (for example, ASIC) that realizes one or more of the functions.

According to the disclosure, it is possible to provide an image pickup apparatus that obtains a combined panoramic image that gives less unpleasant sensation even in a case where there is an object that is at a remote position with a long distance in an optical axis direction in a panning region.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-085317 filed Apr. 26, 2018, which is hereby incorporated by reference herein in its entirety.

What is claimed is:

1. An image pickup apparatus, comprising:
an image sensor configured to pick up a plurality of images;
at least one memory configured to store instructions; and
at least one processor in communication with the at least one memory and configured to execute the instructions to,
perform first detection of detecting movement of the image sensor in performing image pickup by using inertial information,
perform second detection of detecting a positional deviation of the plurality of images by comparing at least some of the plurality of images,
perform a panoramic creation operation that combines the plurality of images on a basis of the detected positional deviation and generates a panoramic image,
generate progress information on the panoramic creation operation and the detected movement of the image sensor, the progress information being represented by a progress form, and
cause the progress form to be displayed on a display,
wherein the progress form includes: (1) a first part in a first indicator to indicate the panoramic creation operation of images up to an Nth frame being completed when an image of an (N+M)th frame is picked up, and (2) a second part in a second indicator different from the first indicator to indicate an accumulation result of the movement of the image sensor detected from an (N+1)th frame to the (N+M)th frame.

2. The image pickup apparatus according to claim 1, wherein the information about the size of the panoramic image is information about a width of the panoramic image.

3. The image pickup apparatus according to claim 1, wherein the first part is not reduced when the movement of the image sensor changes to an opposite direction.

4. The image pickup apparatus according to claim 3, wherein the first and second indicators represent a form which is one of a thickness, a degree of transparency, a color, a color density, a brightness, and a pattern.

5. The image pickup apparatus according to claim 3, wherein the first and second parts are displayed on the display as a bar.

6. The image pickup apparatus according to claim 5, wherein the first and second parts are displayed as bars having lengths corresponding to progress thereof.

7. The image pickup apparatus according to claim 1, wherein the movement of the image sensor is detected on a basis of information of an optical system in the first detection.

8. The image pickup apparatus according to claim 1, wherein the detection is performed by using at least any of a gyro sensor and an acceleration sensor in the first detection.

9. The image pickup apparatus according to claim 1, wherein the at least one processor executes further instructions to stop the image pickup when the panoramic image that is being combined reaches a predetermined maximum range.

10. The image pickup apparatus according to claim 9, wherein the at least one processor executes further instructions to determine whether the panoramic image reaches the predetermined maximum range by using the information indicating the progress of panoramic creation of the panoramic image.

11. A control method for controlling an image pickup apparatus, the image pickup apparatus including
an image sensor configured to pick up a plurality of images,
at least one memory configured to store instructions, and
at least one processor in communication with the at least one memory, the control method comprising:
performing first detection of detecting movement of the image sensor in performing image pickup by using inertial information;
performing second detection of detecting a positional deviation of the plurality of images by comparing at least some of the plurality of images;

performing a panoramic creation operation that combines the plurality of images on a basis of the detected positional deviation and generates a panoramic image;

generating progress information on the combining operation and the detected movement of the image sensor, the progress information being represented by a progress form; and causing the progress form to be displayed on a display, wherein the progress form includes: (1) a first part in a first indicator to indicate the panoramic creation operation of images up to an Nth frame being completed when an image of an (N+M)th frame is picked up, and (2) a second part in a second indicator different from the first indicator to indicate an accumulation result of the movement of the image sensor detected from an (N+1)th frame to the (N+M)th frame.

12. A computer-readable storage medium storing instructions that cause a computer to execute a method for controlling an image pickup apparatus, the image pickup apparatus including an image sensor configured to pick up a plurality of images, at least one memory configured to store instructions, and at least one processor in communication with the at least one memory, the method comprising:

performing first detection of detecting movement of the image sensor in performing image pickup by using inertial information;

performing second detection of detecting a positional deviation of the plurality of images by comparing at least some of the plurality of images;

performing a panoramic creation operation that combines the plurality of images on a basis of the detected positional deviation and generates a panoramic image;

generating progress information on the panoramic creation operation and the detected movement of the image sensor, the progress information being represented by a progress form; and causing the progress form to be displayed on a display, wherein the progress form includes: (1) a first part in a first indicator to indicate the panoramic creation operation of images up to an Nth frame being completed when an image of an (N+M)th frame is picked up, and (2) a second part in a second indicator different from the first indicator to indicate an accumulation result of the movement of the image sensor detected from an (N+1)th frame to the (N+M)th frame.

* * * * *